Oct. 15, 1946.  C. F. HUTCHINGS  2,409,356
GOGGLE
Filed April 15, 1944

CHARLES F. HUTCHINGS
Inventor

Attorneys

Patented Oct. 15, 1946

2,409,356

UNITED STATES PATENT OFFICE 2,409,356

GOGGLE

Charles F. Hutchings, Perinton, N. Y., assignor to Bausch & Lomb Optical Company, Rochester, N. Y., a corporation of New York Application April 15, 1944, Serial No. 531,175

2 Claims. (Cl. 88—54)

This invention relates to goggles and more particularly to a variant density goggle.

It has long been desired to provide goggles, worn for protection against brilliant sunlight and glare and other annoying light conditions, which would afford variant protection in different portions of the lenses of the goggles. Variant density goggle lenses have heretofore been proposed in which the color in the upper portion of each lens has progressively increased toward the upper edge thereof by fusing a wedge of colored glass to a carrier lens and finishing the composite lens to some desired shape. The engaged surfaces of the wedge and carrier lens had to be carefully matched and this complicated the manufacture of such lenses when it was desired to form non-uniform gradient density goggles. These prior goggles for this reason have been costly to manufacture and have not been widely adopted.

I have discovered that a relatively inexpensive goggle can be formed by depositing on the lenses thereof a metallic film of gradient density by a high vacuum thermal evaporation process. As the thickness of the distilled film can be easily controlled during the depositing process, a goggle lens of any desired variant density can be formed.

The metal used to form the film should be one which is highly resistant to corrosion and one that will form a neutral film when viewed by transmitted light. In the now preferred embodiment of the present invention the metal used is an alloy comprising 80% nickel, 13% chromium, and 6% iron. This alloy, now available under the trade name "Inconel," forms a film which is substantially neutral in all thicknesses thereof when viewed by transmitted light. Thus the film forms a substantially neutral filter of variant density and color absorption does not vary throughout the lens. Furthermore, as the film produced is highly resistant to corrosion, little, if any, change occurs in the film even after use under adverse atmospheric conditions such as at sea where the goggle is subject to salt spray.

Lenses have been previously proposed in which a translucent metallic film has been cemented between two plates of glass but the metal film of these goggles has been of constant thickness and used to reflect heat or infra red rays throughout the entire lens.

It is also known that devices for protecting the eyes against heat have been devised by forming a sputtered metallic film for reflecting infra red rays onto a colored glass layer and then cementing a clear glass plate over the filmed areas to protect the same. In some of such devices the thickness of the film was varied so that a worker wearing one of the devices had a relatively heavy film directly in front of his eyes which progressively decreased to permit him to see objects below his eyes.

In these previously proposed protecting devices the colored glass layer was worn adjacent the face with the film intermediate the colored layer and the source of heat to prevent infra red rays from reaching the colored glass layer. As the infra red rays were reflected before reaching the colored glass layer, no absorption occurred in this layer and consequently the same did not become heated.

In the preferred embodiment of the goggle of the present invention the upper and lower portion of the lenses thereof are provided with films of such a variant thickness that the wearer is protected against light rays from sources either above or below his eyes. The thickness of the film progressively increases toward the upper and lower edges of each lens and the central portion of the lens is not filmed or, if filmed, the thickness of the film is such that the latter does not apreciably reduce the density of light incident thereon.

To reduce the reflection from the surface of the film, a colored layer of some suitable transparent material may be cemented to the surface of the lens carrying the film. This colored layer not only reduces the amount of light reflected from the film but also protects the film from frictional wear although the film is relatively hard and can be used without a protecting cover glass. It will be obvious that if a colored glass is used, the glass will reduce the intensity of the light passing through all portions of the lens. Although light incident on and passing through the central portion of the lens will be modified the least, if the wearer should encounter an irritating light source which he normally would be forced to view through the central portion of the lens, he may easily reduce the intensity of the light reaching his eyes by merely raising or lowering his head to bring either the upper or lower films into his line of vision.

It may be desired to provide goggles in which only the upper portion of the lenses are filmed while in some situations it may be desirable to film only the lower portion of the lenses of the goggle. It will be understood, therefore, that in the broadest aspects of the present invention, the lenses of the goggle may carry a variant thickness film on either the upper or lower portions thereof or both.

Other features and advantages of the present invention will appear from the following description taken in connection with the accompanying drawing in which.

Figure 1:
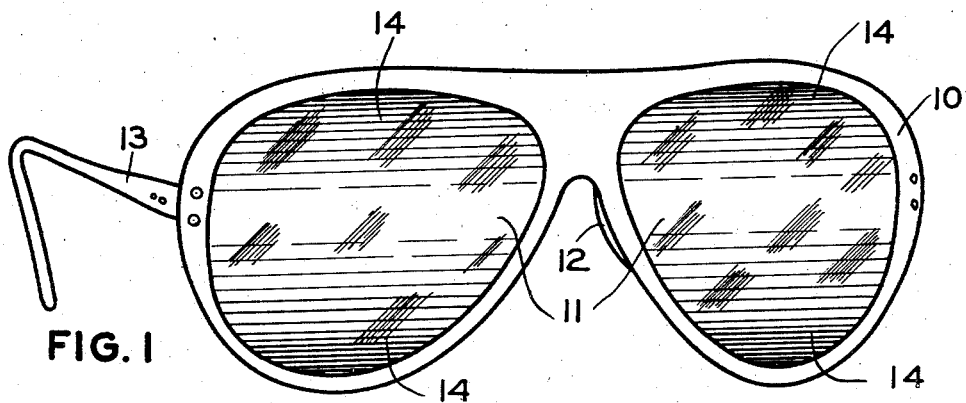
Fig. 1 is a perspective view of a goggle embodying the present invention.

The goggle of the present invention comprises, referring now to the drawing and particularly Fig. 1 thereof, a frame 10 of any suitable material in which are mounted lenses 11. The goggle is supported on the face of the wearer through conventional nose pads 12 and temples 13, only one of each being visible in the figure of the drawing referred to above. The lenses 11 may be formed from any suitable transparent material which may or may not be colored depending upon the desires of the individual wearer.

In the embodiment of the invention illustrated in Fig. 1, one surface of the lens 11 is provided with a film 14 on the upper and lower portions thereof. Although the film may be deposited on either surface of the lens, it has been found that superior results are obtained by forming the film on the outer surface of the lens. With the film deposited on the outer surface of the lens, light entering from behind the lens is not as apt to be reflected back into the eyes of the wearer. The central portion of the lens is not filmed, or if filmed, the thickness of the film is such that light rays are not appreciably modified in passing therethrough. It will be seen, referring particularly to Fig. 2, that the thickness of the film progressively increases from the upper and lower portions of a central zone toward the upper and lower edges, respectively, of the lens.

The film in the now preferred manner of forming the same is deposited on the surface of the lens by a high vacuum thermal evaporation process. Films formed by such processes are generally much harder and adhere more strongly to the surfaces coated than films formed by cathode disintegration methods. In such a process the source of the film-forming material is heated in an evacuated container to a temperature sufficient to cause vapors thereof to be emitted therefrom and condensed on the desired surface of the lens which is mounted adjacent the source.

The material used to form the film should be one, of course, that can be evaporated in a high vacuum and which will form a substantially neutral film in all thicknesses thereof when viewed by transmitted light. The film formed should also be highly resistant to atmospheric corrosion for corrosion would not only affect the neutrality of the film but would also have a deleterious effect on the transparency of the film.

In the now preferred embodiment of the invention the material used to form the film is an alloy comprising substantially 80% nickel, 13% chromium, and 6% iron. This alloy, now available under the trade name "Inconel," can be used to form a film which is substantially neutral at all thicknesses thereof when viewed by transmitted light. This metal is highly resistant to corrosion and goggles carrying such a film can be used even under adverse atmospheric conditions such as at sea where the goggle is subject to salt spray. Films of this alloy are also very hard and readily adhere to clean glass surfaces so that such films are very durable and highly resistant to frictional wear. As films of this alloy are very durable, they need not be protected by a cover glass and a lens such as shown in Fig. 2 will satisfactorily perform over a relatively long period of time.

The thickness of the distilled film which condenses and forms on the selected surface of the lens can be controlled by repeatedly blocking and unblocking the path of the vapors towards the lens by a suitably shaped blocking element. Since the thickness of the film can be easily controlled, any desired variant thickness can be formed during the process. The thickness of the film may vary linearly or non-linearly, and if desired, the film actually could be formed in distinct steps of variant thickness. The area or areas of the surface coated can also be controlled by the selection of the shape of the blocking element and the manner in which the same is moved into and out of the path of the vapors.

Figure 2:
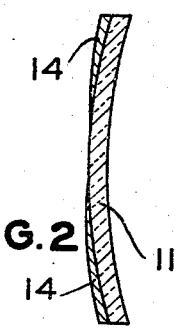
Fig. 2 is a vertical sectional view of a lens of the goggle of the present invention.
Figure 3:
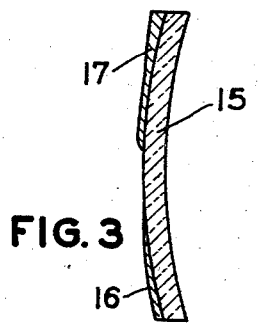
Fig. 3 is a view similar to Fig. 2 but showing a modified form of the lens.

As the thickness of the film can be easily controlled, goggles may be produced, referring now to Fig. 3, in which each lens 15 carries a lower film 16 having a linearly varying thickness and covering a relatively small area. The thickness of the upper film 17 may be of constant thickness for a portion and then increase to a maximum thickness at the upper edge of the lens as shown in Fig. 3.

Where a lens such as illustrated in Figs. 2 and 3 is used, the lens is preferably formed of some suitable colored glass and one which will selectively absorb the ultra violet and infra red rays. If desired, however, the lens may be clear for as the thickness of the film, as well as the area filmed can be controlled, the intensity of the light passing through the central zone of the lens can be reduced to any degree desired.

Figure 4:
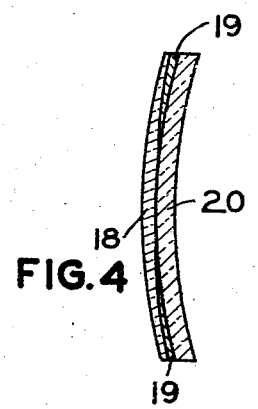
Fig. 4 is a view similar to Fig. 3 but showing a still further modified form of the lens.

As the reflectance of a film of "Inconel" is relatively high, it may be desirable in some uses of the goggle of the present invention to cover the film with some suitable cover glass which will reduce the amount of light reflected from the surface of the film. To this end, referring now to Fig. 4, a cover glass 18 of some suitable colored material, such as glass, can be cemented over the film 19 carried by the outer surface of the lens 20. As the cover glass 18 is formed of colored glass, the amount of light which might otherwise be reflected by the film and visible to an observer is substantially reduced by the passage of the light into and out of the cover glass 18. Where a cover glass of colored material is used, the lens 20 is preferably formed of clear or uncolored glass.

Figure 5:
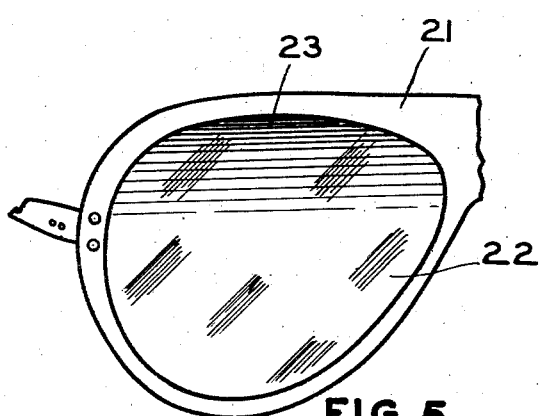
Fig. 5 is a fragmentary view in perspective of another modified form of the goggle of the present invention.
Figure 6:
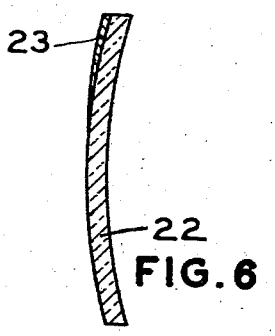
Fig. 6 is a vertical sectional view of the lens of the form of the goggle shown in Fig. 5.

The goggle shown in Fig. 1 is particularly adapted to be worn where brilliant sunlight is encountered and where glare is present from surfaces normally disposed below the eyes of the wearer. This condition is often met by aviators in flight over water or desert land surfaces which reflect a large amount of solar light.

Where protection is not needed from light emanating from sources below the eyes of the wearer, a goggle 21 such as fragmentarily shown in Fig. 5 may be used. In this embodiment of the invention only the upper portion of the lens 22 is filmed, the film 23 being deposited by a process similar to that described in connection with the embodiment of the invention shown in Fig. 1. It should be understood that in this embodiment of the invention the lens 22 may be used as shown in Fig. 6 without a cover glass or if desired, a cover glass similar to that shown in Fig. 4 can be cemented to the surface of the lens carrying the film.

In the broader aspects of the present invention the goggle may comprise any variant thickness film necessary to afford protection against particular light conditions so that although the new preferred embodiments of the present invention have been shown and described herein, it is to be understood that the invention is not to be limited thereby for it is susceptible to the changes in form and detail within the scope of the appended claims.

I claim:

1. In a goggle or the like having a frame carrying lenses, the combination of a semi-transparent metallic layer deposited on the front surface of each lens, the layer increasing in thickness from a minimum at the central portion of the lens to a maximum at the edge of the lens, said layer being substantially neutral to transmitted light and a layer of colored transparent material covering said semi-transparent layer, said layer of colored material substantially reducing the amount of light which is reflected by the outer surface of said semi-transparent layer.

2. In a goggle or the like having a frame carrying lenses, the combination of a semi-transparent metallic layer deposited on the front surface of each lens, the thickness of the layer varying from a minimum at the upper and lower edges of a central zone to a maximum thickness at the upper and lower edges of the lens, said layer being substantially neutral to transmitted light and a layer of colored transparent material covering said semi-transparent layer, said layer of colored material substantially reducing the amount of light which is reflected by the outer surface of said semi-transparent layer.

CHARLES F. HUTCHINGS.